United States Patent
Brutman et al.

(10) Patent No.: US 6,757,785 B2
(45) Date of Patent: Jun. 29, 2004

(54) METHOD AND SYSTEM FOR IMPROVING CACHE PERFORMANCE IN A MULTIPROCESSOR COMPUTER

(75) Inventors: Michael Brian Brutman, Rochester, MN (US); Mahdad Majd, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 09/995,316

(22) Filed: Nov. 27, 2001

(65) Prior Publication Data

US 2003/0101319 A1 May 29, 2003

(51) Int. Cl.⁷ .............................................. G06F 12/00
(52) U.S. Cl. ................... 711/121; 711/129; 711/153; 711/173; 709/215
(58) Field of Search .............................. 711/119, 130, 711/147, 153, 173, 118, 152, 129, 126, 121; 709/215, 216

(56) References Cited

U.S. PATENT DOCUMENTS

| | | | | |
|---|---|---|---|---|
| 5,210,844 A | * | 5/1993 | Shimura et al. | 711/153 |
| 5,634,111 A | * | 5/1997 | Oeda et al. | 711/153 |
| 6,021,468 A | | 2/2000 | Arimilli et al. | 711/122 |
| 6,088,770 A | * | 7/2000 | Tarui et al. | 711/148 |
| 6,105,112 A | | 8/2000 | Arimilli et al. | 711/141 |
| 6,314,501 B1 | * | 11/2001 | Gulick et al. | 711/153 |
| 6,360,303 B1 | * | 3/2002 | Wisler et al. | 711/152 |
| 6,370,622 B1 | * | 4/2002 | Chiou et al. | 711/146 |

* cited by examiner

*Primary Examiner*—Donald Sparks
*Assistant Examiner*—Brian R. Peugh
(74) *Attorney, Agent, or Firm*—Bracewell & Patterson LLP

(57) ABSTRACT

A method and system for allocating and storing data to a cache memory in each processor in a multiprocessor computer system. Data structures in main memory are partitioned into substructures that are classified as either exclusive substructures or sharing substructures. The exclusive substructures are cached exclusively by a specified processor, and the sharing substructures are cached by specified groups of processors in the multiprocessor computer.

14 Claims, 3 Drawing Sheets

| Processors | Hit %, Standard | Hit %, Invention | Improvement |
|---|---|---|---|
| 1 | 100 | 100 | none |
| 2 | 50 | 75 | 1.5x |
| 4 | 25 | 62.5 | 2.5x |
| 8 | 12.5 | 56.25 | 4.5x |
| 16 | 6.25 | 53.13 | 8.5x |

METHOD AND SYSTEM FOR IMPROVING CACHE PERFORMANCE IN A MULTIPROCESSOR COMPUTER

BACKGROUND OF THE INVENTION

1. Technical Field

The present invention relates in general to the field of computers, and, in particular, to computer memories. Still more particularly, the present invention relates to an improved method and system for improving the performance of cache memories in a multiprocessor computer system.

2. Description of the Related Art

Under a typical prior art method of utilizing cache memories in a multiprocessor computer system, common data used by multiple processors is mapped (cached) from a main memory to a cache memory of one or more of the multiple processors in the multiprocessor computer system. Under this traditional method of caching, initially each cache memory of each processor of the multiprocessor computer system may contain a valid copy of the common data. However, after a first processor writes an update to the common data into its cache, only that first processor's cache contains a valid copy of the common data. Whenever another processor needs to read or write to (change) the common data, it will "miss" the cached common data since the valid data is only in the first processor's cache. For example, in a multiprocessor computer having four processors, and assuming that the data is written to frequently, there is a 25% chance that the requesting processor will have the most current common data in its local cache, and thus a cache "hit" occurs when that common data is accessed. The same probability states that there is a 75% chance that the most current common data being requested will be in the cache of one of the other three processors, and thus the requesting processor will incur a cache "miss." A cache "miss" requires the requesting processor to then "snoop" the caches of the other processors for the requested common data, or to go to main memory if none of those caches have the requested data. The description and percentages above assume that each processor has previously cached and is able to change the requested data.

SUMMARY OF THE INVENTION

The present invention recognizes the need to improve the hit ratio of a cache memory in a multiprocessor computer. The present invention therefore is a method and system for allocating and storing data to the cache memory in each processor in a multiprocessor computer system. Data structures in a main memory are partitioned into substructures that are classified as either exclusive substructures or sharing substructures. The exclusive substructures are cached exclusively by a specified processor, and the sharing substructures are cached by specified groups of processors in the multiprocessor computer. The classified partitioning results in an improved cache hit ratio compared to cache hit ratios found in standard caching schemes. This improvement over standard caching schemes becomes greater as the number of processors in the multiprocessor computer increases.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
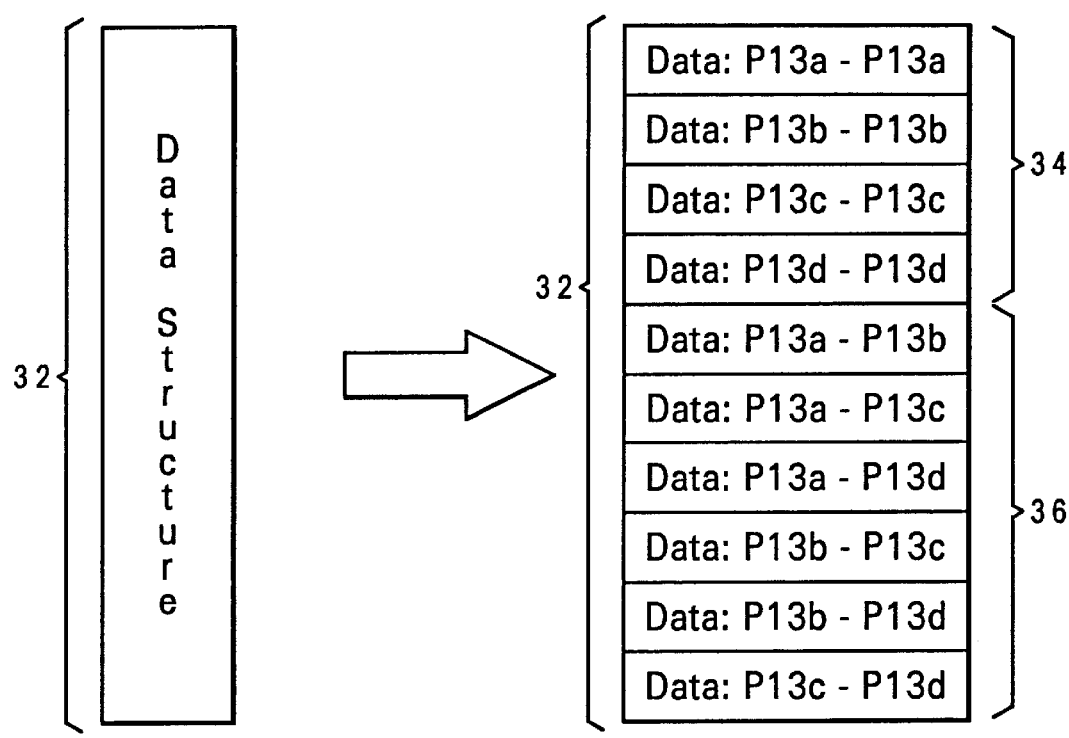
FIG. 1 illustrates a partitioning of a data structure in a main memory of a multiprocessor computer into data exclusive substructures and sharing substructures.

With reference now to the drawings and in particular to FIG. 1, there is depicted a preferred method of partitioning a data structure 32 found in memory 16, described and depicted below in FIG. 2. In a preferred embodiment, data structure 32 is understood to be any group of data located in memory 16. As illustrated in FIG. 1, data structure 32 is partitioned into two classes of data: exclusive substructures 34 and sharing substructures 36.

Exclusive substructures 34 are data that are designated to be copied to and stored in cache memory ("cached") of only one specified processor 13. For example, exclusive substructure 34 labeled "Data: P13a—P13a" is cached only by processor 13a (depicted in FIG. 2). In this example, no processor other than processor 13a is allowed to ordinarily cache or even access "Data: P13a—P13a," unless authorized by software as described below. Each processor 13 is thus assigned its respective exclusive substructure 34.

Sharing substructures 36 are those data that are designated to be cached to more than one of processors 13. That is, each of the sharing substructures 36 is cachable to the cache memory of two or more specified processors 13. For example, sharing substructure 36 labeled "Data: P13a–P13b" is cached to a cache memory 30a and a cache memory 30b (illustrated in FIG. 2) associated with processors 13a and 13b (shown in FIG. 2). While sharing substructures 36 are described and named in FIG. 1 to illustrate each sharing substructure 36 being shared between two processors 13, it is understood that according to the present invention each sharing substructure 36 may be cached by more than two processors 13 in the present invention.

Figure 2:
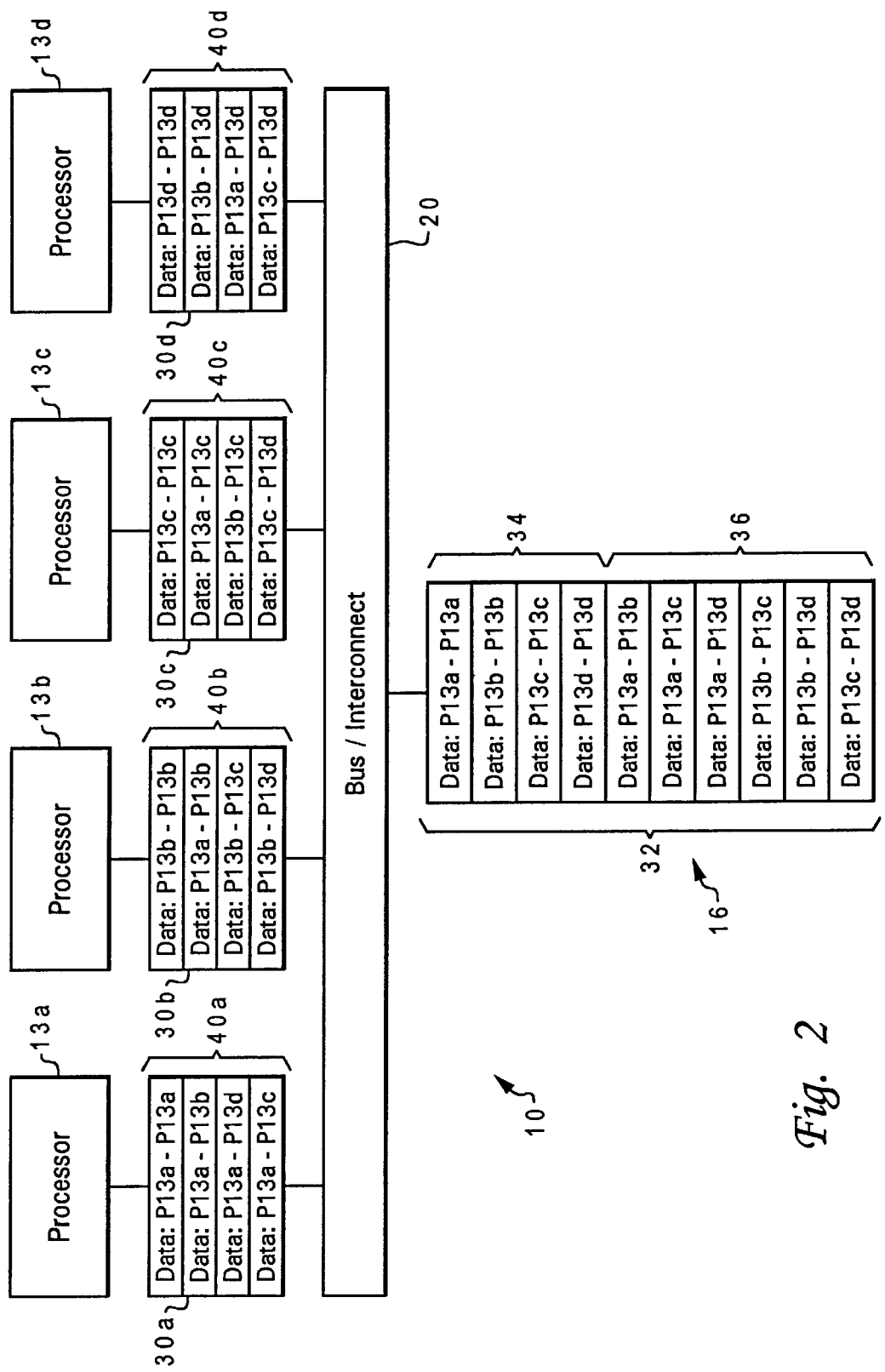
FIG. 2 is a block diagram of a multiprocessor computer system utilizing the present invention's method of partitioning a data structure in a main memory.

Referring now to FIG. 2, there is illustrated a multiprocessor computer system 10 as used by the present invention. Computer system 10 has multiple processors 13, four of which, processor 13a through processor 13d, are depicted. Each processor 13 is connected to various devices (not shown), including input/output (I/O) devices (such as a display monitor, keyboard, graphical pointer (mouse), and a permanent storage device (hard disk)), a main memory Input/Output controller for accessing memory device 16 (such as random access memory or RAM) that is used by the processors to carry out program instructions, and firmware (not shown) whose primary purpose is to seek out and load an operating system from one of the peripherals (usually the permanent memory device) whenever the computer is first turned on. Processors 13 communicate with the peripheral devices by various means, including a generalized interconnect or bus 20, or direct memory-access channels (not shown). Computer system 10 may have many additional components which are also not shown, such as serial and parallel ports for connection to, e.g., modems or printers. Those skilled in the art will further appreciate that there are other components that might be used in conjunction with those shown in the block diagram of FIG. 2; for example, a display adapter might be used to control a video display monitor, a memory controller can be used to access memory 16, etc.

Still referencing FIG. 2, there are illustrated caches 30, associated with each processor 13, that store the substructures of the partitioned data structure 32 depicted in FIG. 1. For example, processor 13a is shown being associated with a cache 30a having four cache lines 40a. A first cache line 40a contains data from exclusive substructures 34 having data labeled "Data: P13a—P13a," indicating data that is cached only by processor 13a. In a preferred embodiment, processor 13a contains instructions directing it to cache the exclusive substructure 34 containing data labeled "Data: P13a—P 13a" only is the first or otherwise specified cache line 40a. The next cache line 40a contains data labeled "Data: P13a–P13b," indicating a sharing substructure 36 that may be cached by both processor 13a and processor 13b. The third cache line 40a contains data labeled "Data: P13a—P13d," indicating a sharing substructure 36 that is cached by both processor 13a and processor 13d. The fourth cache line 40a contains data labeled "Data: P13a–P13c," indicating a sharing substructure 36 that is cached by both processor 13a and processor 13c. In a preferred embodiment, processor 13a contains instructions directing it to cache the above specified sharing substructures 36 in specified caches lines 40a reserved for caching sharing substructures 36. Caches 30b, 30c, and 30d contain data from analogous exclusive substructures 34 and sharing substructures 36 as illustrated for cache 30a.

Figures 3, 4:
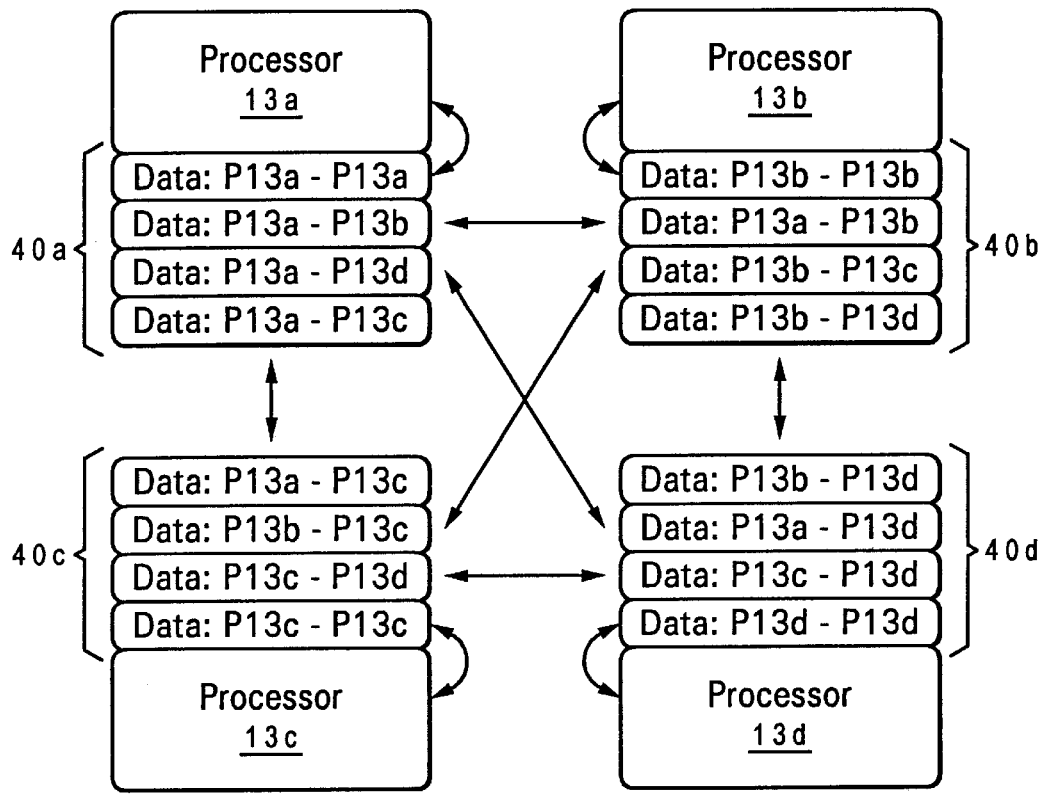
FIG. 3 depicts the sharing relationship between processors of sharing substructures stored in cache lines of cache memories associated with different processors.
FIG. 4 is a chart illustrating cache "hit" improvements using the present invention with various multiprocessor computer systems having different numbers of processors.

Referring now to FIG. 3, there is depicted pictorially the communication relationship between different cache lines 40 according to their specification. For example, data such as "Data: P13A–P13a" defined and depicted in FIG. 2 as exclusive substructures 34 are those frequently used, manipulated and therefore cached by a specified processor 13. An example of such data would be a pointer to a job list or a counter. Preferably, data that is used at all times only by a specific processor 13 remains exclusive to that processor for the purposes of accessing and manipulating. Occasionally some exclusive substructures 34 contain data, such as counters, that may need to be occasionally "collected" or summed. For example, a counter in a cache line 40a such as "Data: P13a—P13a" from exclusive substructure 34 may need to be added to corresponding counters located in exclusive substructures 34 in cache lines 40b (Data: P13b–P13b), 40c (Data: P13c–P13c) and 40d (Data: P13d–P13d) to arrive at the total count for a process. Software would thus allow the data from the exclusive substructures 34 to be accessed by one of the processors 13 or another processing unit (not shown) to "collect" the data from these cache lines 40. However, it should be understood and appreciated by those skilled in the art of software architecture that such data collection (coalescence, summing) are typically infrequent in software operations, and thus will have minimal impact on the overall efficiency of the present invention.

Still referring to FIGS. 2 and 3, sharing substructures 36 are those substructures of data structure 32 that are cached in more than one cache 30, thus allowing two or more processors 13 to communicate through their respective cache lines 40 containing data from the same sharing substructure 36. For example, sharing substructure 36 containing data described as "Data: P13a–P13b" is cachable by both processor 13a and 13b, but no other processors 13. Thus, if processor 13a has a cache "miss," instructions in processor 13a direct processor 13a to snoop processor 13b's cache 30b and no other cache 30.

While FIG. 2 and FIG. 3 depict data being cached to four processors 13, it is understood that the present invention may be used with any number of multiprocessors or nodes. That is, the number of processors to which data is cached may be any integer greater than one. Further, the data may be cached to a group of processors (node, not illustrated). In a preferred embodiment, the multiprocessor system has multiple nodes each containing multiple processors. For example, the multiprocessor system may have 32 processors arranged in four nodes of eight processors each. Data structure 32 is partitioned and shared between nodes just as between processors 13 described above. In this example, each of the four nodes has four cache lines 40 that are shared by all of the processors within the node. One of the four cache lines 40 in the node is used for storage of an exclusive substructure 34, and the remaining three cache lines 40 store sharing substructures 36, analogous to the system and process described above for single processors 13, rather than nodes of processors, making up the multiprocessor system. Thus, the present invention describes data caching in a multiprocessor system having multiple processing units. Each processing unit may be either a single processor 13 or a node of processors.

Also, while in a preferred embodiment each exclusive substructure 34 and each sharing substructure 36 corresponds to a single cache line in cache lines 40, in an alternate embodiment multiple sharing substructures 36 may be assigned to and cached in a single cache line 40 of a particular processor 13 or set of processors 13.

Whether data is cached as described above to processors 13 or nodes or any other processing unit, the present invention improves the cache "hit" ratio. The expected cache hit ratio for data cached from data structure 32 using the present invention can be expressed as:

$$\frac{1}{n} + \frac{\left(1 - \frac{1}{n}\right)}{2}$$

where n is the number of processors that are sharing the data. The term $$\frac{1}{n}$$

reflects the probability the needed data is an exclusive substructure 34 assigned to a cache line in cache 40 of the requesting processor 13. The probability that the needed data is from a sharing substructure 36 is $$1 - \frac{1}{n},$$

but since each processor 13 shares a sharing substructure 36 with one other processor 13 in the example shown, the probability of the most current cache data being in the requesting processor 13 is $$\frac{\left(1-\frac{1}{n}\right)}{2}.$$

The improvement in cache "hit" performance is shown in FIG. 4. The formula for the improvement can be expressed as:

$$\frac{\frac{1}{n}+\frac{\left(1-\frac{1}{n}\right)}{2}}{\frac{1}{n}} \Rightarrow \frac{\frac{1}{2n}+\frac{1}{2}}{\frac{1}{n}} \Rightarrow \left(\frac{1}{2n}+\frac{1}{2}\right)\left(\frac{n}{1}\right) \Rightarrow \frac{1}{2}+\frac{n}{2}$$

Thus, FIG. 4 shows in table format the different hit rates and improvement levels over the prior art using the present invention. For example, with four processors, the standard hit percentage using the prior art method of caching described above is 25%, since the chance of a cache hit using the standard prior art caching system described above is one out of four. The hit percentage using the present invention is 62.5%, for an improvement of 250% (2.5 fold). As seen in FIG. 4, the improvement level over the prior art method of caching increases greatly as the number of processors used in the multiprocessor system increases.

It should be understood that at least some aspects of the present invention may alternatively be implemented in a program product, preferably performing the functions of the present invention in an automatic manner based on predetermined criteria as described, including relative logical relationships between and among logic areas. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention, Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for improving cache memory performance in a data processing system having multiple processing units, said method comprising:
    partitioning a main memory data structure into a plurality of exclusive substructures and at least one sharing substructure;
    storing a first exclusive substructure of the plurality of exclusive substructures, assigned to a first processing unit, only in a first exclusive cache memory area associated with said first processing unit from said multiple processing units; and
    storing one of said at least one sharing substructure only in a first shared cache memory area associated with said first processing unit and a second shred cache memory area associated with a second processing unit of said multiple processing units, wherein said first exclusive substructure of the plurality of exclusive substructures is accessible only to said first processing unit, and said one of said at least one substructure is accessible only to said first and second processing units.

2. The method of claim 1, wherein said first exclusive cache memory area is a first cache line in a cache memory in said first processing unit.

3. The method of claim 1, wherein each of the multiple processing units comprises a single processor.

4. The method of claim 1, wherein each of the multiple processing units comprises a node of multiple processors.

5. The method of claim 1, further comprising:
    storing a second exclusive substructure, assigned to said second processing unit, only in a second exclusive cache memory associated with said second processing unit, wherein said first exclusive substructure is a counter of operations performed by said first processing unit and said second exclusive substructure is a counter of operations performed by said second processing unit, and wherein said first and second exclusive substructures are accessible by any of said multiple processing units only if authorized by one of the multiple processing units for the purpose of determining a total count of operations performed by all of said multiple processing units.

6. A multiprocessor computer comprising:
    a plurality of processing units comprising a first processing unit and a second processing unit, each of said plurality of processing units having a central processing unit and a cache memory;
    a main memory having a data structure partitioned into a plurality of exclusive substructures and at least one sharing substructure;
    a first processing unit, from said plurality of processing units, having:
        a first exclusive cache memory area and a first shared cache memory area; and
    a second processing unit, from said plurality of processing units, having:
        a second exclusive cache memory area and a second shared cache memory area;
    wherein only said first processing unit is able to access an exclusive substructure, assigned to said first processing unit, in said first exclusive cache memory area, and wherein only said first and second processing units are able to access a sharing substructure, assigned to said first and second processing units, from said at least one sharing substructures.

7. The multiprocessor computer of claim 6, wherein said first exclusive cache memory area is a first cache line in a cache memory in said first processing unit.

8. The multiprocessor computer of claim 6, wherein each of said plurality of processing units comprises a node of multiple processors.

9. The multiprocessor computer of claim 6, wherein the second exclusive cache memory stores only a second exclusive substructure, assigned to said second processing unit, wherein said first exclusive substructure is a counter of operations performed by said first processing unit and said second exclusive substructure is a counter of operations performed by said second processing unit, and wherein said first and second exclusive substructures are accessible by any of said multiple processing units only if authorized by one of the multiple processing units for the sole purpose of arriving at a total count of operations performed by all of said multiple processing units.

10. A computer program product, residing on a computer usable medium, for improving cache memory performance in a data processing system having multiple processing units, said computer program product comprising:

computer program code for partitioning a main memory data structure into a plurality of exclusive substructures and at least one sharing substructure;

computer program code for storing a first exclusive substructure of the plurality of exclusive substructures assigned to a first processing unit, only in a first exclusive cache memory area associated with said first processing unit from said multiple processing units; and computer program code for storing one of said sharing substructure only in a first shared cache memory area associated with said first processing unit and a second shared cache memory area associated with a second processing unit of said multiple processing units, wherein said said first exclusive substructure is accessible only to said first processing unit, and said one of said sharing substructure is accessible only to said first and second processing units.

11. The computer program product of claim 10, wherein said first exclusive cache memory area is first cache line in a cache memory in said first processing unit.

12. The computer program product of claim 10, wherein each of the multiple processing units comprises a single processor.

13. The computer program product of claim 10, wherein each of the multiple processing units comprises a node of multiple processors.

14. The computer program product of claim 10, further comprising:

computer program code for storing a second exclusive substructure, assigned to said second processing unit, only in a second exclusive cache memory associated with said second processing unit, wherein said first exclusive substructure is a counter of operations performed by said first processing unit and said second exclusive substructure is a counter of operations performed by said second processing unit, and wherein said first and second exclusive substructures are accessible by any of said multiple processing units only if authorized by one of the multiple processing units for the sole purpose of arriving at a total count of operations performed by all of said multiple processing units.

\* \* \* \* \*

UNITED STATES PATENT AND TRADEMARK OFFICE
CERTIFICATE OF CORRECTION

PATENT NO. : 6,757,785 B2
DATED : June 29, 2004
INVENTOR(S) : Michael Brian Brutman and Mahdad Majd It is certified that error appears in the above-identified patent and that said Letters Patent is hereby corrected as shown below:

<u>Column 6,</u>
Line 1, "shred" should be -- shared --.

Signed and Sealed this

Seventh Day of September, 2004

JON W. DUDAS
*Director of the United States Patent and Trademark Office*